United States Patent [19]

Franklin

[11] 4,314,978

[45] Feb. 9, 1982

[54] INCREASED PRODUCTION OF WET PROCESS PHOSPHORIC ACID BY GELATIN ADDITION

[75] Inventor: John C. Franklin, Arvada, Colo.

[73] Assignee: Texasgulf Inc., Stamford, Conn.

[21] Appl. No.: 229,468

[22] Filed: Jan. 29, 1981

[51] Int. Cl.³ .............................................. C01B 25/16
[52] U.S. Cl. .................................... 423/320; 423/166; 423/555
[58] Field of Search .................... 423/321 R, 320, 166, 423/167, 555

[56] References Cited

U.S. PATENT DOCUMENTS 2,133,251  10/1938  McCord .......................... 423/321 R

FOREIGN PATENT DOCUMENTS 376178  7/1932  United Kingdom ............ 423/321 R

OTHER PUBLICATIONS

Industrial and Engineering Chemistry Process Design and Development, 388, Oct. 1966 (Gilbert, R.).
Chemical Engineering, 137, Aug. 15, 1966 (James, G. R.).
Journal of Colloid Science, 13, 383–396, 1958 (McCartney, E. R. and Alexander, A. E.).

*Primary Examiner*—O. R. Vertiz
*Assistant Examiner*—Gregory A. Heller
*Attorney, Agent, or Firm*—Denis A. Polyn

[57] ABSTRACT

An improved method for the production of wet process phosphoric acid wherein the addition of relatively small amounts of gelatin to the reaction system substantially increases the filtration rate of the calcium sulphate crystals without adversely affecting the quality of the acid.

12 Claims, No Drawings

INCREASED PRODUCTION OF WET PROCESS PHOSPHORIC ACID BY GELATIN ADDITION

BACKGROUND OF THE INVENTION

1. Field of the Invention

This invention relates to the increased production of phosphoric acid, and, more particularly, to the increased production of phosphoric acid by the addition of gelatin to the reaction system.

2. Description of the Prior Art

Phosphoric acid is produced in the traditional wet process by the action of an inorganic acid on phosphate rock, producing phosphoric acid and the calcium salt of the acid used. Sulfuric acid is the preferred inorganic acid in that it produces an insoluble calcium sulfate which may be filtered. The calcium sulfate may be precipitated as a dihydrate ($CaSO_4.2H_2O$) which is also known as gypsum, or as a hemihydrate ($CaSO_4.\frac{1}{2}H_2O$), or as an anhydrite ($CaSO_4$).

The overall reaction for the dihydrate process is usually indicated as follows:

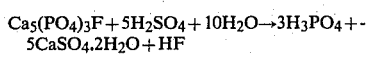

$$Ca_5(PO_4)_3F + 5H_2SO_4 + 10H_2O \rightarrow 3H_3PO_4 + 5CaSO_4.2H_2O + HF$$

There are also many secondary reactions which occur depending on the other minerals of the apatite series present in the phosphate rock. The dihydrate process involves the digestion of phosphate rock with strong sulfuric acid and weak recycled phosphoric acid for a given period of time, the time required to fully develop filterable and washable gypsum crystals. A single, or multiple, reaction tank may be utilized. The slurry is continuously drawn off, cooled, and filtered. The gypsum is finally washed with wash liquor containing approximately 2–5% $P_2O_5$, and the washed gypsum is disposed of. This process produces approximately a 30% $P_2O_5$ acid, which can then be concentrated to higher $P_2O_5$ levels.

The principal objectives of any commercial phosphoric acid process should be:

1. To extract the maximum amount of $P_2O_5$ from the phosphate rock.
2. To precipitate a rapidly filtering and easily washable calcium sulfate.
3. To produce a phosphoric acid having as high a $P_2O_5$ content as possible.
4. Continuous production over long periods at design capacities.
5. Minimum operating, labor, and maintenance costs.
6. Safe, clean plant operation, with absence of air and water pollution.

In the production of phosphoric acid by the wet process, the separation of calcium sulphate from phosphoric acid is an important step. This separation is generally accomplished by filtration using any number of well known devices. The large quantities of phosphoric acid produced in commercial plants requires filters of large area and complexity in order to insure good separation and recovery of the phosphoric acid. These filters are costly and difficult to maintain in good operating condition. In general, the concentration of phosphoric acid produced is limited to about 30% $P_2O_5$ because higher concentrations cause lower filtration rates. These low rates are due to changes in the calcium sulfate crystals which are produced as by-product in wet process phosphoric acid. Phosphoric acid of greater than 45% $P_2O_5$ is more desireable to produce, but the calcium sulphate hemihydrate crystals which are produced in this concentration range are very difficult to filter.

The size and shape of the calcium sulphate crystals are extremely important factors in proper filtration and washing. The three most important factors effecting crystal growth are:

1. sulfate ion content;
2. phosphate ion content; and,
3. type and amount of impurities present.

Operating conditions and reactor design also influence crystal formation. The most desireable crystal forms would be rhombic or clusterlike, and the least desired would be needlelike or platelike crystals.

The effect of impurities on the filterability of calcium sulphate crystals has been discussed in Industrial and Engineering Chemistry Process Design and Development, 388, October 1966 (Gilbert, R.), and a summary of phosphoric acid filtration is presented in Chemical Engineering, 137, Aug. 15, 1966 (James, G. R.). An article by E. R. McCartney and A. E. Alexander entitled "The Effect of Additives upon the Process of Crystallization", Journal of Colloid Science 13, 383–396 (1958), describes the effects of gelatin on calcium sulphate crystal growth.

An object of this invention is the improvement of the filtration rate of the phosphoric acid-calcium sulphate slurry formed in the production of wet process phosphoric acid. This improvement will allow a smaller filtration area to be used in phosphoric acid plants and will also permit increased production in plants where current filtration area is limited. Since the filtration rate generally decreases as the concentration of the phosphoric acid increases, this invention will allow higher strength phosphoric acid to be produced without an increase in filtration area necessary. This invention also has application to the production of strong phosphoric acid such as that made in a hemihydrate process. The present invention improves the filtration rate of the slurry produced in the phosphoric acid wet process by from about 5% to about 30%, and this increased filtration rate is accomplished by adding relatively small amounts of gelatin to the reaction system. The addition of gelatin to the reaction system does not affect the color or viscosity of the phosphoric acid.

SUMMARY OF THE INVENTION

In a method for producing wet process phosphoric acid in a reaction system wherein at least one inorganic acid is reacted with a phosphate containing material for a period of time sufficient to develop filterable washable calcium sulphate crystals, the improvement comprising:

Adding a relatively small amount of gelatin to said reaction system to substantially increase the filtration rate of said calcium sulphate crystals without adversely affecting the quality of said wet process phosphoric acid.

A preferred embodiment of the present invention comprises adding at least about 0.05 lb. to about 5.0 lb. of gelatin per short ton of $P_2O_5$ in phosphate containing material.

A second preferred embodiment of the present invention comprises adding a relatively small amount of gelatin to increase the filtration rate of the calcium sulphate crystals from about at least 5% to about 30%.

A third preferred embodiment of the present invention is utilizing a gelatin selected from the group comprising all commercial grades of gelatin, including any material derived from the bones, connective tissue, or skin of animals.

A further preferred embodiment of each of the foregoing preferred embodiments is the filtration of calcium sulphate crystals that are substantially in the dihydrate form.

A second further preferred embodiment of each of the foregoing preferred embodiments is the filtration of calcium sulphate crystals that are substantially in the hemihydrate form.

A third further preferred embodiment of each of the foregoing preferred embodiments is the filtration of calcium sulphate crystals that are substantially in the anhydrite form.

DESCRIPTION OF THE PREFERRED EMBODIMENT

The size and shape of the calcium sulphate crystals formed during the digestion phase of the wet process greatly effect the filtration rate of the phosphoric acid slurry. There are certain compounds well known in the wet process phosphoric acid art for affecting the calcium sulphate crystal habit, the most commonly used being sulfonic acid salts.

The previously cited article from the Journal of Colloid Science teaches that gelatin can, under laboratory conditions, slow the growth rate of calcium sulphate crystals. I have now discovered, quite surprisingly, that the addition of a relatively small amount of gelatin to a wet process phosphoric acid reaction system will significantly increase the filtration rate of calcium sulphate crystals without adversely affecting the quality of the phosphoric acid.

The present invention improves the filtration rate of the slurry (i.e. calcium sulphate and phosphoric acid) produced in the phosphoric acid wet process. The addition of relatively small amounts of gelatin (i.e. at least about 0.1 lb. of gelatin per short ton of $P_2O_5$) to the phosphoric acid reaction system will increase the filtration rate of the calcium sulphate crystals from about at least 5% over that of a system which does not contain gelatin. An enhanced filtration rate increase as great as 30% has been obtained using about 0.2 lbs. of gelatin per short ton of $P_2O_5$ in phosphate containing material in a dihydrate process.

The gelatin can be any one of the following readily available commercial products: pharmaceutical grade, photographic grade, edible grade, or technical grade, and, preferably, it should be technical grade.

The gelatin can be added with any of the feedstocks, or it can be added directly to the reaction system. Preferably, the gelatin should be added to the sulphuric acid dilution water or directly to the digestor where the phosphate concentrate is added. The gelatin can be added to the system as an aqueous solution, containing about 60 grams of gelatin per liter of solution, with the temperature of the solution being maintained at about 100° F. The aqueous gelatin solution can be prepared on a continuous basis in a mixing tank, with the gelatin and water being fed continuously to a constantly stirred, heated tank.

It is important to note that the gelatin, in addition to being relatively cheap (i.e. $1.50 to $2.00 per pound), has no adverse affect on the quality of the phosphoric acid produced. The use of gelatin in the wet process reaction system does not increase the color or viscosity of the phosphoric acid.

The following examples will illustrate various ways in which the principle of the invention may be applied, but are not to be construed as limiting the invention.

EXAMPLE 1

A phosphoric acid pilot plant producing about 0.4 lb. of $P_2O_5$ per hour was operated on a semi-continuous basis. Three digestion cells of 2.7 liter each were used in a simulation of the Prayon design. Phosphate rock and recycle acid were added to the first digestion cell. Sulfuric acid was diluted to about 50% $H_2SO_4$ before being added to the second cell. Slurry was recycled from the third cell to the first cell. U.S.P. grade gelatin in the amount of about 0.1 lb. per ton of $P_2O_5$ was added to the sulphuric acid dilution water. Filtration tests were performed using slurry produced by the pilot plant. While producing product acid containing about 26% $P_2O_5$ acid, an increase in filtration rate of 10.2% was obtained. While producing acid containing 30% $P_2O_5$, an increase of 18.8% was obtained.

EXAMPLE 2

During operation of a Prayon phosphoric acid plant designed to produce 525 TPD of $P_2O_5$, edible grade gelatin was continuously added for a six-day period in the amount of about 0.2 lb. per ton of $P_2O_5$. The gelatin was batch-mixed in a tank with water as a 120 g/l lyophilic solution at 125° F. The solution was added to the sulphuric acid dilution water prior to mixing with the sulphuric acid. The filtration rate of the slurry was increased by an average of 10% during gelatin addition as compared to operation with no gelatin addition. The filtration rate increase was as high as 30% when operating at a relatively low sulphate concentration of 1.9% sulfuric acid. The gelatin addition did not affect the phosphate losses in the filter cake.

I claim:

1. In a method for producing wet process phosphoric acid in a reaction system wherein at least one inorganic acid is reacted with a phosphate containing material for a period of time sufficient to develop filterable and washable calcium sulphate crystals, the improvement comprising:
   adding a relatively small amount of gelatin to said reaction system to substantially increase the filtration rate of said calcium sulphate crystals without adversely affecting the quality of said wet process phosphoric acid.

2. In a method according to claim 1, wherein said relatively small amount of gelatin is at least about 0.05 lb. of gelatin per short ton of $P_2O_5$ in phosphate containing material.

3. In a method according to claim 1, wherein the filtration rate of said calcium sulphate crystals is increased from about five percent to about thirty percent.

4. In a method according to claim 1, wherein said relatively small amount of gelatin is at least about 0.05 lb. of gelatin per short ton of $P_2O_5$ in phosphate containing material and the filtration rate of said calcium sulphate crystals is increased from about at least about five percent.

5. In a method according to either claims 1 or 4, wherein said calcium sulphate crystals are substantially in the dihydrate form.

6. In a method according to either claims 1 or 4, wherein said calcium sulphate crystals are substantially in the hemihydrate form.

7. In a method according to either claims 1 or 4, wherein said calcium sulphate crystals are substantially in the anhydrite form.

8. In a method according to either claims 1 or 4, wherein said gelatin is selected from the group comprising all commercial grades of gelatin products.

9. In a method according to claim 1, wherein said gelatin is technical grade gelatin.

10. In a method according to claim 1, wherein said gelatin is added to said reaction system as an aqueous solution.

11. In a method according to claim 10, wherein said aqueous gelatin solution is added to the inorganic acid dilution water or to the digestor where the phosphate concentrate is added.

12. In a method according to claim 1, wherein said relatively small amount of gelatin is at least about 0.05 lb. of gelatin per short ton of $P_2O_5$ in phosphate containing material; wherein said gelatin is technical grade gelatin; wherein said gelatin is added to said reaction system as an aqueous solution; and, wherein said aqueous gelatin solution is added to the inorganic acid dilution water or to the digestor where the phosphate concentrate is added.

* * * * *